March 31, 1936.  M. ANDERSON  2,035,442
ADJUSTABLE BAR OR SPREADER FOR CULTIVATORS
Filed April 2, 1935
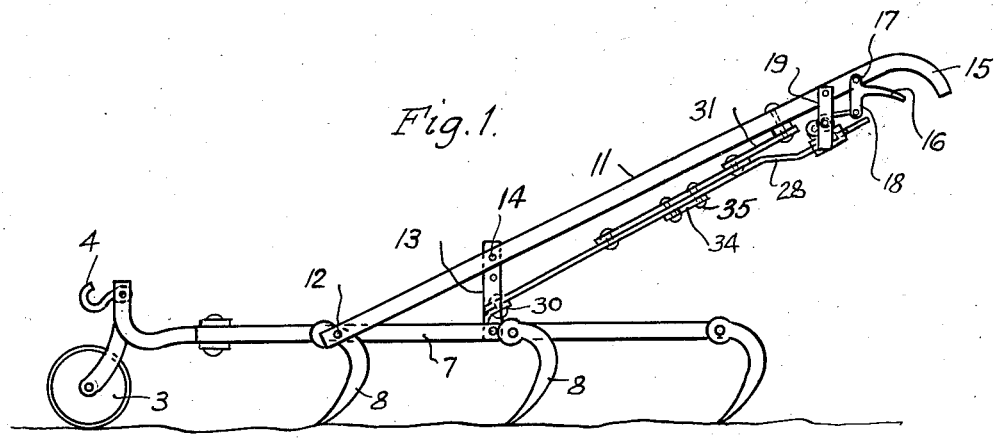
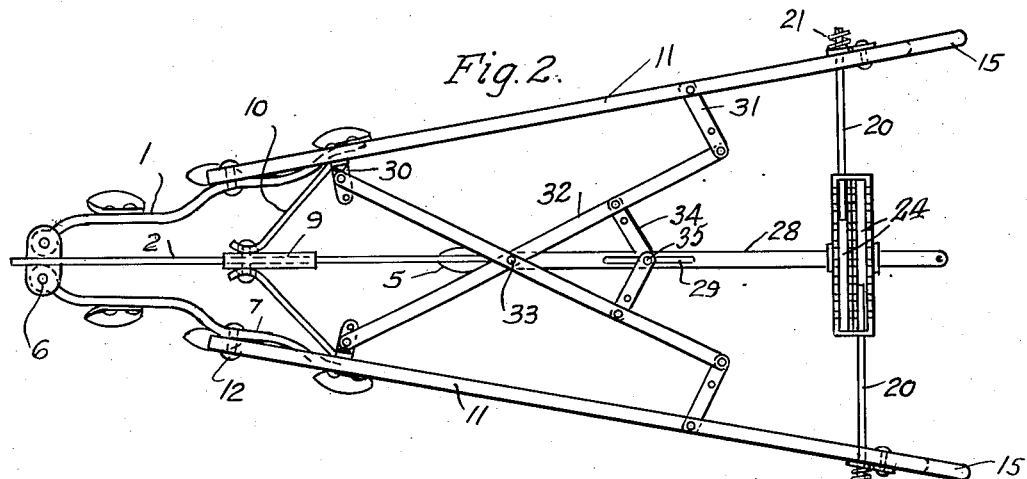
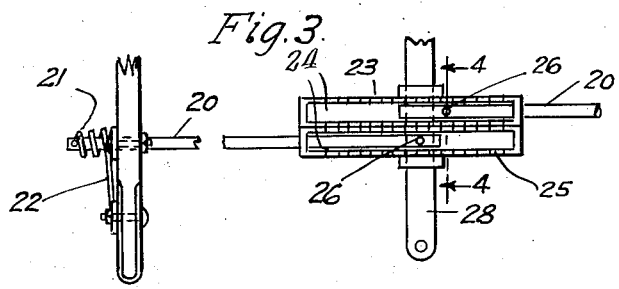
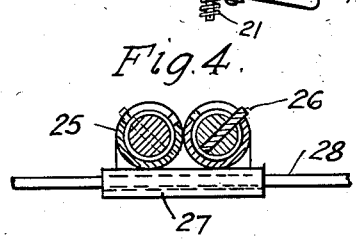
INVENTOR.
Mathew Anderson
BY
Watson E. Coleman
ATTORNEY.

Patented Mar. 31, 1936

2,035,442

UNITED STATES PATENT OFFICE 2,035,442

ADJUSTABLE BAR OR SPREADER FOR CULTIVATORS

Mathew Anderson, Arvada, Colo.

Application April 2, 1935, Serial No. 14,355

8 Claims. (Cl. 97—172)

This invention relates to improvements in the class of plows and pertains particularly to an improved cultivator plow.

The primary object of the present invention is to provide an improved cultivator plow of the type having an expansible frame whereby the plows may be spread apart or moved together, as desired, to suit the conditions under which it is being used, wherein the relative adjustment of the plows is effected by the relative movement or spreading of the plow handles.

In certain cultivator plows of the type described, means is provided for spreading the frame and separating or relatively adjusting the plow elements through the medium of a lever which is moved forwardly or rearwardly on the plow structure. In the use of this adjustment, the operator of the plow must release one of the handles of the same and it is somewhat difficult to obtain the desired adjustment without stopping or slowing up the movement of the plow. In other instances, adjustment can only be made by completely stopping the cultivator and spreading the parts by hand after releasing certain securing or locking elements.

In the present invention, the construction is such that the operator of the cultivator may make the desired adjustment of the plow elements without slackening his pace or releasing the cultivator handles, merely by spreading or pulling together the handles after releasing a conveniently located latch, the spreading action of the handles being facilitated through the medium of link mechanism therebetween whereby the plow element carrying beams of the cultivator are given the desired movement for enlarging or reducing the size of the cultivator frame.

A further object of the invention is to provide a new and novel mechanism of the above described character wherein a novel latching construction is employed for securing the plow handles and for releasing them for movement without removing the hands from the handles.

The invention will be best understood from a consideration of the following detailed description taken in connection with the accompanying drawing forming part of this specification, with the understanding, however, that the invention is not confined to any strict conformity with the showing of the drawing but may be changed or modified so long as such changes or modifications mark no material departure from the salient features of the invention as expressed in the appended claims.

In the drawing:

Figure 1 is a view in side elevation of a cultivator showing my improved construction;

Figure 2 is a view in top plan of the invention with portions of the cultivator frame structure broken away;

Figure 3 is a view in top plan on an enlarged scale of the hand grip of a handle shaft and sliding connection between the handle shafts;

Figure 4 is a sectional view taken on the line 4—4 of Figure 3;

Figure 5 is a view in side elevation of the connecting guide structure for the bars between the handles.

Referring to the drawing wherein like numerals of reference designate corresponding parts throughout the several views, the numeral 1 indicates generally a cultivator of the type commonly known as a one-horse cultivator, wherein there is a central drag or pull bar 2 which is supported at its forward end upon a caster wheel 3 and carries at this end a draft hook 4 by means of which the draft animal may be hitched to the cultivator. The central drag bar carries a plow 5 and adjacent its front end are lateral ears 6 to each of which is pivotally attached a plow beam 7 which extends rearwardly and has attached thereto the plows 8. These plow beams 7 are normally disposed in rearwardly divergent relation and are swingable relative to one another and to the central drawbar 2 so as to increase or decrease the coverage of the machine.

The central draft or drag bar 2 has a sleeve 9 slidably mounted thereon to each side of which is pivotally attached one end of a link 10. These links are pivotally joined at their outer ends with the lateral plow beams 7 and together with the sleeve 9 constitute a portion of the usual construction of cultivators of this character.

In carrying out the present invention, there are provided the two handle bars 11, each of which is bolted at one end, as indicated at 12, to a plow beam 7 and extends upwardly and rearwardly therefrom in the manner illustrated in Figure 1. Each of the plow beams has secured thereto an upright bracket 13 across which a handle bar extends and each of these brackets has a plurality of apertures therein through one of which a bolt 14 is passed to extend through an aperture in the adjacent handle bar so as to secure the handle bar rigidly in position. The height of the rear ends of the handle bars which are formed to provide handle grips 15 may thus be varied by changing the aperture through which each bolt 14 passes in the bracket 13, to accommodate operators of different heights.

Adjacent each hand grip 15, each handle bar 11 has a finger lever 16 pivotally attached thereto, as indicated at 17, and integral with each of these levers is a depending ear portion 18. Immediately forwardly of each finger lever 16 a depending strap bracket 19 is secured through which passes one end of a rod 20 which is rotatable in the bracket 19. Each of these rods at their outer ends extends through a helical spring 21 which has one end secured to the rod and has its other end extended rearwardly, as indicated at 22, for attachment to the depending ear portion 18 of the finger lever 16.

The rods 20 extend across between the handle bars 11, in overlapping relation and midway between the handle bars are two tubular bodies or guides 23 which are secured in side by side relation and into one end of each of which a rod 20 is slidably extended. These tubular guides form a coupling means between the rods 20 and in addition form with the rods a brace or connection between the rear ends of the handle bars.

Each of the tubular guides 23 is longitudinally open or slotted, as indicated at 24, and these openings or slots are directed upwardly and each has along each edge a plurality of notches 25. Each of the rods 20 carries upon the end which lies within the tubular guide 23, a laterally extending pin 26 which is adapted to engage in one of the notches 25 to normally prevent longitudinal movement of the rod. The springs 21 are so tensioned as to normally urge the rods to which they are attached to oscillate in a direction to engage the latch pin 26 thereof in one of the notches 25 and by oscillating the finger levers 16, the springs connected therewith through the medium of the ears 18 will be caused to oscillate the rods so as to release the latch pins 26 from their respective notches 25 and permit the rods to be relatively and longitudinally shifted in the guide tubes or sleeves 23. Release of the finger latches 16 permits the springs on reacting to reversely oscillate the rods and cause the latch pins to engage in one of the notches.

The slotted guide sleeves 23 have a transversely extending guide 27 secured midway of their ends and this transverse guide has extended therethrough a bar 28 which is provided intermediate its ends with a longitudinal slot 29.

Pivotally attached to each plow beam 7, preferably at the point where the vertical handle bar supporting bracket 13 is secured, is one end of a short inwardly extending link 30 and pivotally attached to each handle bar toward the rear end of the same, that is, in proximity to but forwardly of the bars 20, is an inwardly extending link 31 which has several apertures therethrough adjacent its inner end for the purpose hereinafter to be described. Disposed between and coupling the forward and rear links 30 and 31 are the crossed bars 32 which are pivotally joined together at 33. Each of these bars at its forward end is pivotally attached to a link 30 and at its rear end is pivotally attached to a link 31 on the opposite handle bar. In addition, the forward end of the bar 28 is pivotally attached to the bars 32 at the point 33.

Between the point 33 where the bars 32 cross and the rear ends of these bars where they are pivotally attached to the links 31, each bar 32 has pivotally attached thereto one end of an intermediate link 34 which is pivotally joined to a pin 35 which couples the ends of these intermediate links and which passes through and is slidable in the slot 29 of the centrally located longitudinally extending bar 28.

It will thus be seen that the crossed bars 32 will operate in the nature of lazy tongs between the handle bars 11 when the latter are forced to move relative to one another. From this, it will be apparent that in the operation of the present invention, the operator of the cultivator, without stopping or slackening his pace, may enlarge the frame or decrease its size as he desires, merely by oscillating the finger levers 16 while he holds the hand grips 15, so as to effect the oscillation of the tie or coupling rods 20 between the handle bars to release the same from their guides. The handle bars may then be forced apart or together and because of the lazy tong link connection between the same, the forward as well as the rear ends will be relatively moved. Since the forward ends are fixed to the plow beams 7, it is apparent that these beams will be caused to swing on their pivots 6 and thus bring about the desired relative re-arrangement of the plows 8. As soon as the finger levers are released, the rods 20 will be automatically secured in position by the reactance of the springs 21 which will re-locate the latch fingers in the notches of the guide sleeves in which the rods 20 are located.

What is claimed is:—

1. In a cultivator having a frame including a fixed element and a pair of earth working element carrying beams pivotally attached thereto, a pair of handle bars each secured to one of said beams, each of said handle bars being formed at one end to provide a hand grip, mechanism coupling said handle bars and plow beams facilitating uniform simultaneous movement of the bars and beams together or away from one another relative to said fixed element upon the application to the bars of inwardly or outwardly directed force, and means connecting between the handle bars for securing the same against relative movement.

2. In a cultivator having a frame including a fixed element and a pair of earth working element carrying beams pivotally attached thereto, a pair of handle bars each joined at one end to a beam, the bars extending upwardly and rearwardly of the cultivator in divergent relation, a slip coupling between the handle bars at their rear ends, the said rear ends of the handle bars being formed to provide hand grips, latch mechanism for securing said slip coupling, and a link connection between the handle bars and the beams operating to transmit spreading or contracting movement to the forward ends of the handle bars and to said beams when the rear ends of the handle bars are relatively moved.

3. In a cultivator having a frame including a fixed element and a pair of earth working element carrying beams pivotally attached thereto, a pair of handle bars each secured at one end to a plow beam and extending upwardly and rearwardly in divergent relation with the other and terminating in a hand grip, and link mechanism coupling the handle bars and the beams whereby relative movement between the hand grip ends of the bars will be transmitted to the forward ends of the bars and to the plow beams to effect the simultaneous movement of the same.

4. In a cultivator having a frame including a fixed element and a pair of earth working element carrying beams pivotally attached thereto, a pair of handle bars each secured at one end to a plow beam and extending upwardly and rearwardly in divergent relation with the other and terminating in a hand grip, and a lazy tong coupling between the handle bars and the beams whereby relative movement of the hand grip ends of the same will be transmitted to the forward ends thereof and to the plow beams to effect simultaneous movement of the plow beams.

5. In a cultivator having a frame including a fixed element and a pair of earth working element carrying beams pivotally attached thereto, a pair of handle bars each secured at one end to a plow beam and extending upwardly and rearwardly in divergent relation with the other and terminating in a hand grip, a lazy tong coupling between the handle bars and the beams whereby relative movement of the hand grip ends of the same will be transmitted to the forward ends thereof and to the plow beams to effect simultaneous movement of the plow beams, a pair of bar members each carried by a handle bar and extending transversely of the cultivator, a sliding coupling between the said bar members, means latching the bar members with said sliding coupling, and means operable from the hand grips of the handle bars for releasing the said latching connection.

6. In a cultivator having a frame including a fixed element and a pair of earth working element carrying beams pivotally attached thereto, a pair of handle bars each secured at one end to a plow beam and extending upwardly and rearwardly in divergent relation with the other, each of said handle bars terminating at its rear end in a hand grip, means for adjusting the elevation of the rear ends of the handle bars above the cultivator, a pair of inwardly extending links secured to each handle bar, a pair of crossed bars disposed between the handle bars and pivotally connected intermediate their ends, a pivotal connection between the forward end of each of the crossed bars and a link of a handle bar, a pivotal connection between the rear end of each of the crossed bars and the other link of the opposite handle bar, a longitudinally extending bar pivotally attached at one end to the point of connection between the crossed bars, a pair of links slidably and pivotally coupling the crossed bars with the longitudinal bar, a telescopically joined coupling between the rear ends of the handle bars, and means providing a sliding support for the longitudinally extending bar upon said coupling.

7. In a cultivator having a frame including a fixed element and a pair of earth working element carrying beams pivotally attached thereto, a pair of handle bars each secured at one end to a beam and extending upwardly and rearwardly in divergent relation with the other, each of said handle bars terminating at its rear end in a hand grip, a pair of latch fingers pivotally attached to each bar adjacent the hand grip, a pair of rods each oscillatably supported at one end upon one handle bar adjacent the latch thereon, the other ends of the rods being in overlapping relation between the handle bars, means receiving and slidably supporting the overlapped ends of the rods, a resilient connection between each of said latch elements and the adjacent rod for effecting the oscillation of the rod upon the swinging of the latch, and means normally coupling the said rods and the means slidably receiving the same, which releases the rods for longitudinal movement relative to the said receiving means when the rods are oscillated and permits relative movement between the handle bars.

8. In a cultivator having a frame including a fixed element and a pair of earth working element carrying beams pivotally attached thereto, a pair of handle bars each secured at one end to a beam and extending upwardly and rearwardly in divergent relation with the other, each of said handle bars terminating at its rear end in a hand grip, a latch element pivotally attached to each bar adjacent the hand grip, a pair of rods each oscillatably supported adjacent one end from a handle bar and extending inwardly toward the other rod, a pair of slotted guide elements fixedly supported between the handle bars and each slidably receiving the other end of a rod, each of said slotted guide elements having a plurality of notches along an edge of the slot therein, a pin carried by each rod for engagement in a notch, and a coil spring encircling the first mentioned end of each rod and secured at one end thereto and having its other end secured to the adjacent latch whereby oscillation of the latch will effect the oscillation of the rod.

MATHEW ANDERSON.